United States Patent
Zhang et al.

(10) Patent No.: US 9,703,545 B2
(45) Date of Patent: Jul. 11, 2017

(54) METHOD AND SYSTEM FOR UPDATING IN-VEHICLE NAVIGATION MAP, IN-VEHICLE NAVIGATION DEVICE AND MOBILE TERMINAL

(71) Applicant: BAIDU ONLINE NETWORK TECHNOLOGY (BEIJING) CO., LTD., Beijing (CN)

(72) Inventors: Binglin Zhang, Beijing (CN); Wang Liu, Beijing (CN); Guanming Cai, Beijing (CN); Lihui Xun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/947,438

(22) Filed: Nov. 20, 2015

(65) Prior Publication Data
US 2016/0154643 A1    Jun. 2, 2016

(30) Foreign Application Priority Data
Nov. 28, 2014 (CN) .......................... 2014 1 0714744

(51) Int. Cl.
| | |
|---|---|
| *G06F 9/445* | (2006.01) |
| *G01C 21/32* | (2006.01) |
| *G06F 17/30* | (2006.01) |
| *G01C 21/26* | (2006.01) |
| *H04L 29/08* | (2006.01) |

(52) U.S. Cl.
CPC .............. *G06F 8/65* (2013.01); *G01C 21/26* (2013.01); *G01C 21/32* (2013.01); *G06F 17/30241* (2013.01); *H04L 67/141* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 8,849,308 B2 * | 9/2014 | Marti ................... | H04W 4/043 455/456.1 |
| 2009/0177677 A1 * | 7/2009 | Mikusiak ............... | G01C 21/32 |
| 2014/0180585 A1 * | 6/2014 | Balogh .................. | G01C 21/32 701/533 |

FOREIGN PATENT DOCUMENTS

| | | |
|---|---|---|
| CN | 102331578 | 1/2012 |
| CN | 102883322 | 1/2013 |
| CN | 103037538 | 4/2013 |
| CN | 103369056 | 10/2013 |
| CN | 103438893 | 12/2013 |
| DE | 102005029744 | 12/2006 |
| DE | 102013008562 | 12/2013 |

(Continued)

*Primary Examiner* — Chuck Kendall
(74) *Attorney, Agent, or Firm* — Hodgson Russ LLP (57) ABSTRACT

The present disclosure provides a method and a system for updating an in-vehicle navigation map, an in-vehicle navigation device, and a mobile terminal. The method includes: establishing a connection with a mobile terminal; sending a configuration file of the in-vehicle navigation map to the mobile terminal via the connection, in which the configuration file includes regions and versions of map data corresponding to the regions; receiving latest map data sent by the mobile terminal, and updating the map data of regions corresponding to the latest map data, in which the latest map data is obtained by the mobile terminal according to the configuration file.

9 Claims, 5 Drawing Sheets

(56) References Cited

FOREIGN PATENT DOCUMENTS

| | | |
|---|---|---|
| EP | 1562021 | 8/2005 |
| JP | 2009017216 | 1/2009 |
| JP | 2009093080 | 4/2009 |
| JP | 2009264875 | 11/2009 |
| JP | 2012220587 | 11/2012 |
| JP | 2013085050 | 5/2013 |
| JP | 2013234922 | 11/2013 |
| KR | 20120028956 | 3/2012 |
| KR | 20130001811 | 1/2013 |
| KR | 20140104484 | 8/2014 |

* cited by examiner

METHOD AND SYSTEM FOR UPDATING IN-VEHICLE NAVIGATION MAP, IN-VEHICLE NAVIGATION DEVICE AND MOBILE TERMINAL

FIELD

The present disclosure relates to in-vehicle navigation technology, and more particularly to a method and a system for updating an in-vehicle navigation map, an in-vehicle navigation device and a mobile terminal.

BACKGROUND

Among driving auxiliary devices of a vehicle, the in-vehicle navigation device is widely deployed in vehicle industry since it may help users identify their exact locations at any time, and may plan routes to a destination by itself.

The in-vehicle navigation device mainly receives the position coordinates transmitted from the GPS satellites via the built-in GPS (Global Positioning System) antenna, and matches the received position coordinates with the stored electronic map to determine the exact location of the vehicle.

However, with the continuous improvement of municipal construction, electronic map operating companies will update electronic maps accordingly to accommodate new roads and buildings. Therefore, the in-vehicle navigation device also needs to update the stored electronic map.

Currently, the in-vehicle navigation map may only be updated by specialized technicians from 4S shops or repair shops via upgrading map versions, which requires to pay a certain fee to 4S shops or repair shops every updating, thus resulting in high cost in updating the in-vehicle navigation map.

SUMMARY

Embodiments of the present disclosure provide a method for updating an in-vehicle navigation map, an in-vehicle navigation device and a system for updating an in-vehicle navigation map, which reduce the cost of updating the in-vehicle navigation map.

In a first aspect, the present disclosure provides a method for updating an in-vehicle navigation map. The method is performed by an in-vehicle navigation device, and includes: establishing a connection with a mobile terminal; sending a configuration file of the in-vehicle navigation map to the mobile terminal via the connection, in which the configuration file includes regions and versions of map data corresponding to the regions; and receiving latest map data sent by the mobile terminal, and updating in the in-vehicle navigation map the map data of regions corresponding to the latest map data, in which the latest map data is obtained by the mobile terminal according to the configuration file.

In a second aspect, the present disclosure provides a method for assisting updating an in-vehicle navigation map. The method is performed by a mobile terminal and includes: establishing a connection with an in-vehicle navigation device; receiving a configuration file of the in-vehicle navigation map from the in-vehicle navigation device via the connection, in which the configuration file includes regions and versions of map data corresponding to the regions; and obtaining latest map data according to the configuration file, and sending the latest map data to the in-vehicle navigation device for updating the map data of regions corresponding to the latest map data.

In a third aspect, the present disclosure provides an in-vehicle navigation device, and the in-vehicle navigation device includes: a connecting module, configured to establish a connection with a mobile terminal; a file sending module, configured to send a configuration file of the in-vehicle navigation map to the mobile terminal via the connection, in which the configuration file includes regions and versions of map data corresponding to the regions; and a data receiving module, configured to receive latest map data sent by the mobile terminal, and update in the in-vehicle navigation map, the map data of regions corresponding to the latest map data, in which the latest map data is obtained by the mobile terminal according to the configuration file.

In a fourth aspect, the present disclosure provides a mobile terminal, and the mobile terminal includes: a connecting module, configured to establish a connection with an in-vehicle navigation device; a file receiving module, configured to receive a configuration file of an in-vehicle navigation map sent from the in-vehicle navigation device via the connection, in which the configuration file includes regions and versions of map data corresponding to the regions; and a data obtaining and sending module, configured to obtain latest map data according to the configuration file, and send the latest map data to the in-vehicle navigation device, such that the in-vehicle navigation device updates the map data of regions corresponding to the latest map data.

In a fifth aspect, the present disclosure provides a system for updating an in-vehicle navigation map, and the system includes the above in-vehicle navigation system and the above mobile terminal. The in-vehicle navigation device is configured to establish a connection with the mobile terminal, and send a configuration file of the in-vehicle navigation map to the mobile terminal via the connection, in which the configuration file includes regions and versions of map data corresponding to the regions. The mobile terminal is configured to obtain latest map data according to the configuration file, and send the latest map data to the in-vehicle navigation device. The in-vehicle navigation device is further configured to receive the latest map data, and update the map data of regions corresponding to the latest map data.

With the method and system for updating the in-vehicle navigation map, the in-vehicle navigation device and the mobile terminal according to embodiments of the present disclosure, by sending the configuration file of the in-vehicle navigation map to the mobile terminal, obtaining the latest map by the mobile terminal according to the configuration file, and receiving the latest map sent by the mobile terminal, the map data of corresponding regions in the in-vehicle navigation map may be updated without going to 4S stores or repair factories, and thus the cost for updating the in-vehicle navigation map may be effectively reduced, and a user may update the in-vehicle navigation map via the mobile terminal in a self-service manner, which improves the efficiency and real-time property for updating the in-vehicle navigation map.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

In the following, the present disclosure will be described in detail with reference to drawings and embodiments. It should be understood that, the specific embodiments described herein are only used to illustrate the present disclosure but do not limit the scope of the present disclosure. It also should be noted that, for ease of description, only parts related with the present disclosure, instead of the overall structure, are shown in the drawings.

The method for updating an in-vehicle navigation map according to an embodiment of the present disclosure may be performed by an in-vehicle navigation device.

Embodiment 1

Figure 1A:
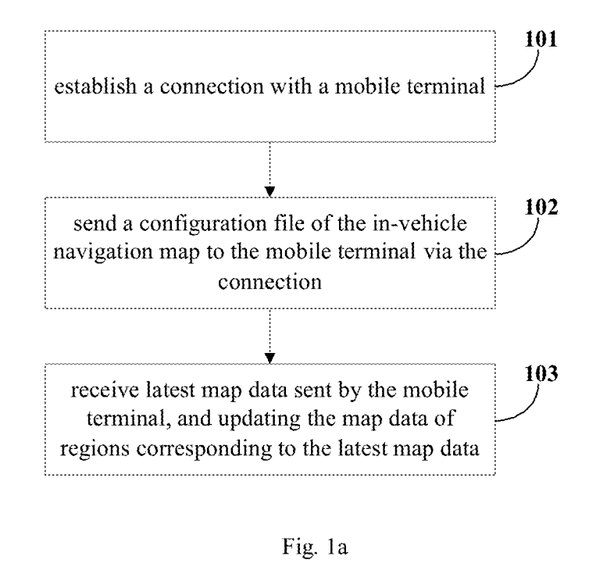
FIG. 1a is a flow chart of a method for updating an in-vehicle navigation map according to an embodiment of the present disclosure.

Referring to FIG. 1a, the method for an updating in-vehicle navigation map according to an embodiment of the present disclosure specifically includes following steps.

In step 101, a connection with a mobile terminal is established.

Figure 1B:
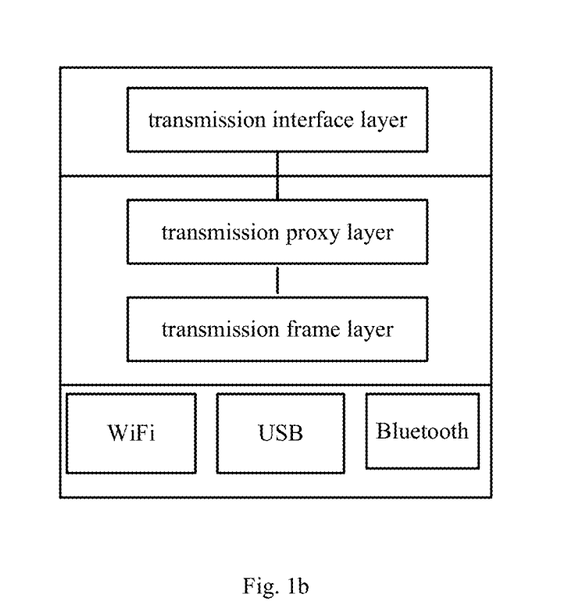
FIG. 1b is a block diagram of a transmission structure used in a method for updating an in-vehicle navigation map according to an embodiment of the present disclosure.

For example, the in-vehicle navigation device may be connected with the mobile terminal via Bluetooth, NFC (Near Field Communication, short-range wireless communications technology), USB (Universal Serial Bus), WiFi (Wireless-Fidelity), etc., such that the in-vehicle navigation device may interact with the mobile terminal and obtain the latest map data via the mobile terminal. As the transmission structure shown in FIG. 1b, the lowest layer includes the WiFi module, the NFC module, the USB module and the Bluetooth module, the upper layer includes the transmission framework layer and the transmission proxy layer, and the top layer is the transmission interface layer, in which the transmission proxy layer is mainly responsible for managing and coordinating different transport implementations. This transmission structure may seamlessly expand various transport implementations.

The mobile terminal may be an electronic device with a network communication function and a wireless communication function, such as mobile communication terminals, personal digital assistants (referred to as PDAs), portable computers, smart phones, netbooks, mobile Internet devices (referred to as MIDs), ultra mobile personal computers (referred to as UMPCs), tablet PCs, MP3 players and MP4 players, etc. These electronic devices may perform short distance wireless communication (including the P2P communication), or perform network communication via base stations, access points (referred to APs), or sending and receiving text messages.

In step 102, a configuration file of the in-vehicle navigation map is sent to the mobile terminal via the connection.

The configuration file includes region information and versions of map data corresponding to the region information.

Specifically, the region information of map data may be names of administrative regions, such as Beijing municipality, Shandong province, Guangxi Zhuang Autonomous Region, or may be abbreviations of the administrative regions, such as Chuan, Lu, Yue, Gan and other abbreviations, or may also be codes of the regions, for example, the code of Beijing municipality may be 010, the code of Shanghai municipality may be 021, etc. The codes may take advantage of existing codes, such as telephone area codes, vehicle license plate numbers, etc. Alternatively, the map provider may set the codes according to a certain order, for example, according to the sizes of the regions from large to small, or according to the number of population from most to least.

The versions of map data corresponding to the region information may be versions after last update. If the in-vehicle navigation map stored in the in-vehicle navigation device has never been updated, the versions may be the initial versions.

The in-vehicle navigation device sends the configuration file to the mobile terminal, such that the mobile terminal may know which regions need to be updated and which regions do not need to be updated. Then, the mobile terminal may only download the map data which needs to be updated, thus reducing unnecessary data downloading and improving the downloading efficiency.

In step 103, latest map data sent by the mobile terminal is received, and the map data of regions corresponding to the latest map data is updated, in which the latest map data is obtained by the mobile terminal according to the configuration file.

For example, the in-vehicle navigation device may receive the latest map data sent from the mobile terminal via WiFi, or via NFC, Bluetooth and USB, etc.

During updating the map data, it is possible to directly replace the old version of map data with the new version of map data.

With the method for updating the in-vehicle navigation map according to embodiments of the present disclosure, by sending the configuration file of the in-vehicle navigation map to the mobile terminal, obtaining the latest map by the mobile terminal according to the configuration file, and receiving the latest map sent by the mobile terminal, the map data of corresponding regions in the in-vehicle navigation map may be updated without going to 4S stores or repair factories, and thus the cost for updating the in-vehicle navigation map may be effectively reduced, and a user may update the in-vehicle navigation map via the mobile terminal in a self-service manner, which improves the efficiency and real-time property for updating the in-vehicle navigation map. Further, since the mobile terminal may download the map data via WiFi, zero flow downloading may be realized, thus further saving the cost for updating the in-vehicle navigation map.

For establishing the connection between the in-vehicle navigation device and the mobile terminal via WiFi, a hotspot may be established by the in-vehicle navigation device or by the mobile terminal. Specifically, the in-vehicle navigation device establishes a WiFi hotspot, and receives and responds to a request initiated by the mobile terminal for accessing the WiFi hotspot.

For example, the in-vehicle navigation device with the hotspot function may perform the above operations so as to establish the connection with the mobile terminal. Thus, even if the mobile terminal has the hotspot function, the hotspot may be generated by the in-vehicle navigation device, thus saving power consumption of the mobile terminal.

Once the in-vehicle navigation device establishes the WiFi hotspot, the mobile terminal needs to know the SSID (Service Set Identifier) of the WiFi hotspot. In this case, establishing the WiFi hotspot includes generating a two-dimensional code containing the SSID of the WiFi hotspot, such that the mobile terminal may obtain the SSID of the WIFI hotspot by scanning the two-dimensional code.

For example, when establishing the WiFi hotspot, the in-vehicle navigation device generates the two-dimensional code of the WiFi hotspot, and thus the mobile terminal may obtain the SSID via scanning, without the need of manual input.

In an embodiment, the in-vehicle navigation device sends the configuration file of the in-vehicle navigation map to the mobile terminal by SOCKET communication, and receives the latest map data from the mobile terminal by SOCKET communication. This is because, the process communication between the in-vehicle navigation device and the mobile terminal may be achieved by SOCKET, without updating the configuration of the in-vehicle navigation device and the mobile terminal, since it has a low requirement on the configuration of the in-vehicle navigation device and the mobile terminal.

Embodiment 2

This embodiment is based on the above embodiment, and another method for updating an in-vehicle navigation map is provided.

Figure 2A:
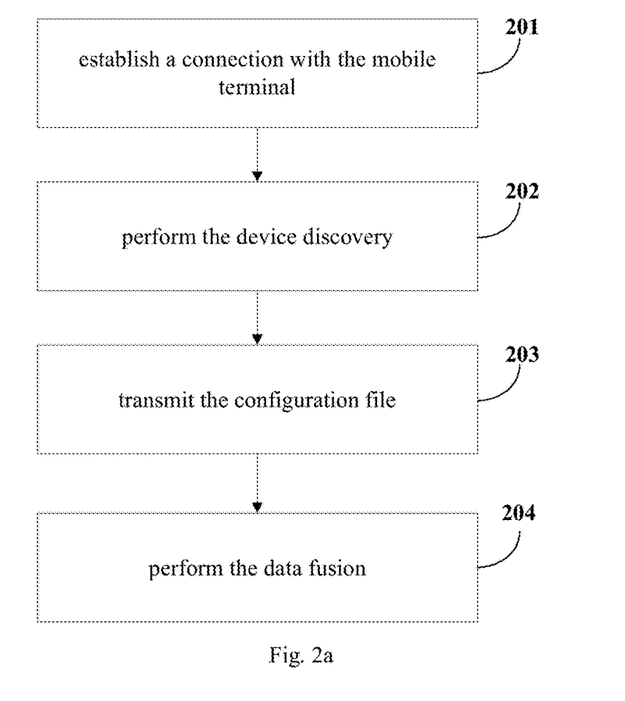
FIG. 2a is a flow chart of a method for updating an in-vehicle navigation map according to another embodiment of the present disclosure.

Referring to FIG. 2a, the method for updating an in-vehicle navigation map according to this embodiment of the present disclosure specifically includes following steps.

In step 201, a connection with a mobile terminal is established.

Specifically, the in-vehicle navigation device initiates the operation of establishing a hotspot, and after the establishing, a two-dimensional code is generated, in which the information of the two-dimensional code is the SSID of the hotspot. Thus, if the mobile terminal such as the mobile phone scans the two-dimensional code, it may obtain the SSID. Then, the mobile terminal matches the SSID with an AP (Access Point) list including scanned APs. If the SSID is in the AP list, then the connection with the AP is established, i.e. a connection with the in-vehicle navigation device is established.

In step 202, a device discovery is performed.

After establishing the connection between the in-vehicle navigation device and the mobile terminal, a small LAN (local area network) is established for the in-vehicle navigation device and the mobile terminal. If the in-vehicle navigation device and the mobile terminal communicate with each other by SOCKET, they need to know the IP address of the server side. Herein, each of the in-vehicle navigation device and the mobile terminal may be the server side. For example, if the in-vehicle navigation device is the server side, the mobile terminal is the client side; if the mobile terminal is the server side, the in-vehicle navigation device is the client side.

In this embodiment, the address of the server side is obtained using UDP (User Datagram Protocol) and LAN broadcasting. The in-vehicle navigation device and the mobile terminal send respective IP addresses to the group address 224.0.0.1 (the group address may be any one from 224.0.0.0 to 239.255.255.255) via a multicast socket MulticastSocket, and then obtain the IP address of the opposite side by receiving the broadcast message, such that the client knows the IP address of the server.

In step 203, a configuration file is transmitted.

After the in-vehicle navigation device and the mobile terminal obtain the IP address of each other, the in-vehicle navigation device sends to the mobile terminal an offline map, which is the configuration file of map data currently stored in the in-vehicle navigation device. The configuration file records province information of the map data, and versions of the map data corresponding to respective provinces. After receiving the configuration file, the mobile terminal accesses the map application server to obtain a region list including provinces whose map data is updatable. The mobile terminal such as the mobile phone may download the updated map data in environments with WiFi networks, such as restaurants or buses with wireless routers, etc. When the mobile terminal is connected to the in-vehicle navigation device again, the downloaded map data may be sent to the in-vehicle navigation device. The data may be sent via NFC, USB or Bluetooth, or may be sent by the above SOCKET communication.

In step 204, data fusion is performed.

After receiving the offline province data sent from the mobile terminal such as the mobile phone (i.e. the map data downloaded by the mobile terminal in step 203), the in-vehicle navigation device saves the received map data in corresponding province map data folders. When the in-vehicle navigation device is restarted for navigation, the new data is merged with the old data, thus updating the in-vehicle navigation map.

Figure 2B:
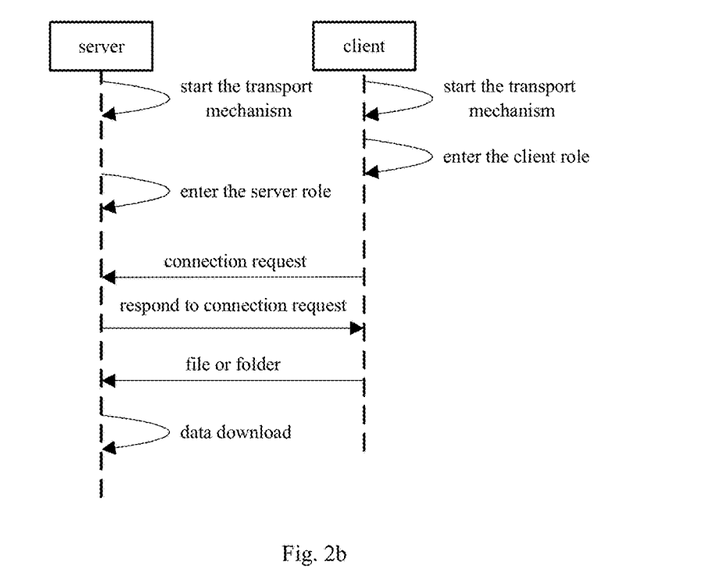
FIG. 2b is a schematic diagram showing signaling procedure of a method for updating an in-vehicle navigation map according to an embodiment of the present disclosure.

FIG. 2b shows the corresponding signaling procedure. As shown in FIG. 2b, the client and the server first start respective transport functions to enter respective roles, and then the client sends a connection request to the server, and the server responds to the connection request, thus establishing a connection between them. Then, the client sends the folder or file to the server, and the server obtains data from the network side after receiving the folder or file. Here, the mobile terminal stands for the server, the in-vehicle navigation device stands for the client, the folder or file may be the configuration file sent to the mobile terminal by the in-vehicle navigation device, and the obtained data may be the latest version of map data or the above region list.

With the method for updating the in-vehicle navigation map provided in this embodiment, the in-vehicle navigation device establishes a connection with the mobile terminal by establishing the hotspot, and thus zero traffic is spent by transmitting the configuration file. Moreover, the mobile terminal downloads the map data via WIFI, and thus the in-vehicle navigation device spends zero traffic on updating the map data.

The method for assisting updating the in-vehicle navigation map provided in this embodiment is corresponding to the above embodiment, and is performed by the mobile terminal.

Embodiment 3

Figure 3:
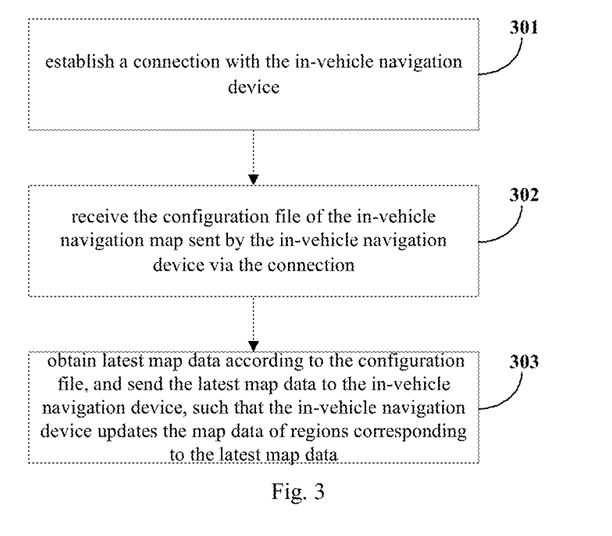
FIG. 3 is a flow chart of a method for assisting updating an in-vehicle navigation map according to an embodiment of the present disclosure.

Referring to FIG. 3, a method for assisting updating an in-vehicle navigation map is provided in this embodiment.

Specifically, the method in this embodiment includes following steps.

In step 301, a connection with an in-vehicle navigation device is established.

For example, the connection between the mobile terminal and the in-vehicle navigation device may be a wireless connection, or may be a USB connection, specific description of which is shown in Embodiment 1 and will not be elaborated here.

In step 302, a configuration file of the in-vehicle navigation map sent by the in-vehicle navigation device is received via the connection. The configuration file contains region information and versions of map data corresponding to the region information.

Specific description of the region information and the versions is shown in Embodiment 1, and will not be elaborated here.

In step 303, latest map data is obtained according to the configuration file, and sent to the in-vehicle navigation device, such that the in-vehicle navigation device updates the map data of regions corresponding to the latest map data.

For example, the mobile terminal may download the map data via WiFi or mobile operators' networks. During downloading, the mobile terminal may download the highest version (i.e. the latest version) of map data from the map application server at the network side according to the versions in the configuration file, or the mobile terminal may download the map data of all the regions from the map application server. Then, the mobile terminal compares the versions of the downloaded map data with the versions in the configuration file to obtain the regions whose map data needs to be updated. In the downloaded map data, the map data corresponding to the regions whose map data needs to be updated is the latest map data.

With the method for assisting updating the in-vehicle navigation map provided in this embodiment, the mobile terminal receives the configuration file of the in-vehicle navigation map sent by the in-vehicle navigation device, obtains the latest map data according to the configuration file, and sends the latest map data to the in-vehicle navigation device for updating the map data of corresponding regions, and thus the in-vehicle navigation map may be updated without going to 4S stores or repair factories, the cost for updating the in-vehicle navigation map may be effectively reduced, and a user may update the in-vehicle navigation map via the mobile terminal in a self-service manner, which improves the efficiency and real-time property for updating the in-vehicle navigation map.

The mobile terminal may establish a WIFI connection with the in-vehicle navigation device in the following way.

For example, the mobile terminal scans for WiFi hotspots to obtain an AP list, in which the AP list includes the WiFi hotspot established by the in-vehicle navigation device. Then, the mobile terminal accesses the WiFi hotspot established by the in-vehicle navigation device.

For example, a user may use the mobile terminal to scan for surrounding WIFI hotspots, and thus obtain the AP list (i.e. the surrounding WIFI hotspots) including the WiFi hotspot established by the in-vehicle navigation device. After finding the WiFi hotspot established by the in-vehicle navigation device from the AP list, the user clicks for connection, such that the connection with the in-vehicle navigation device is realized.

In an embodiment, before accessing the WiFi hotspot established by the in-vehicle navigation device, the following step may be performed.

A two-dimensional code generated by the in-vehicle navigation device is scanned for obtaining the SSID of the WiFi hotspot established by the in-vehicle navigation device, in which the information contained in the two-dimensional code is the SSID of the WiFi hotspot generated by the in-vehicle navigation device.

Corresponding to the method for assisting updating the in-vehicle navigation map, the user may turn the camera or lens of the mobile terminal towards the two-dimensional code for scanning once the in-vehicle navigation device generates the two-dimensional code containing the SSID of the WiFi hotspot established by itself, such that the SSID of the WiFi hotspot established by the in-vehicle navigation device is obtained. Thus, the user may easily find the WiFi hotspot established by the in-vehicle navigation device from the AP list. Alternatively, the user does not need to find which one is the WiFi hotspot established by the in-vehicle navigation device, and leaves everything to be handled by the mobile terminal. That is, the mobile terminal may access the WIFI hotspot established by the in-vehicle navigation device automatically without the user's manual operation.

For example, the mobile terminal may automatically accesses the AP matched with the SSID of the WIFI hotspot established by the in-vehicle navigation device.

For example, the mobile terminal may compare the SSID obtained by scanning the two-dimensional code with SSIDs in the AP list one by one, and once the SSID obtained by scanning the two-dimensional code is found in the AP list, the connection is triggered.

In an embodiment, the latest map data is obtained from the network side via WIFI.

For example, after the mobile terminal receives the configuration file, the user may go to other places with WIFI for downloading the map data, such that zero traffic is spent on obtaining the latest map data of the in-vehicle navigation map. In other words, it is free to obtain the latest map data of the in-vehicle navigation map.

In an embodiment, obtaining the latest map data according to the configuration file includes following steps.

First, a region list is obtained from the map application server, in which the region list contains regions whose map data is updatable and versions of the map data corresponding to the regions in the map application server.

Then, the latest map data is obtained according to the region list and the configuration file.

For example, if the region list obtained by the mobile terminal obtained from the network side contains regions which do not exist in the configuration file, the mobile terminal only downloads the map data corresponding to the regions which exist both in the region list and the configuration file.

In an embodiment, before downloading the latest map data from the map application server, the mobile terminal compares the versions in the region list with the versions in the configuration file. If the version of a region in the configuration file is lower than the version of the region in the region list, the mobile terminal downloads the map data of the region.

For example, for a same region, if the version in the region list is the same with the version in the configuration file, the mobile terminal will not download the map data of this region. Instead, only when the version in the region list is higher than the version in the configuration file, the mobile terminal will download the map data of the region. Thus, in one hand, unnecessary data downloading and unnecessary network load may be reduced, and in the other hand, the download speed may be enhanced.

Embodiment 4

Based on above embodiments, the process of obtaining the latest map data is optimized in this embodiment.

Figure 4:
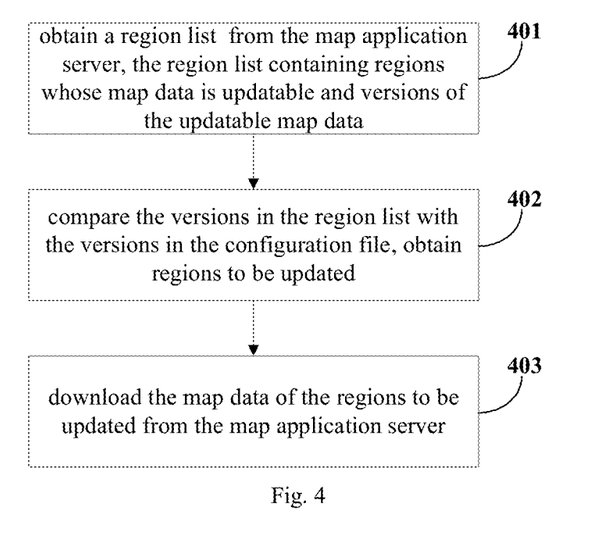
FIG. 4 is a flow chart showing obtaining latest map data in a method for assisting updating an in-vehicle navigation map according to an embodiment of the present disclosure.

Referring to the FIG. 4, following steps are performed to obtain the latest map data.

In step 401, a region list is obtained, in which the region list contains regions whose map data is updatable and versions of the map data corresponding to the regions in the map application server.

In step 402, the versions in the region list are compared with the versions in the configuration file, so as to obtain regions to be updated.

For example, if the map data version of Shanghai in the configuration file is lower than the version of Shanghai in the region list, then it means Shanghai is a region to be updated, i.e. the map data corresponding to Shanghai needs to be updated.

In step 403, the map data of regions to be updated is downloaded from the map application server.

The map application server stores the latest versions of map data of all the regions, which is large in data size, but the activity area of the user is relatively small compared to the entire region, and thus there is no need to update the map data of regions which do not exist in the configuration file. In an embodiment, the mobile terminal may download the map data of the regions to be updated from the map application server via WiFi, and thus zero traffic is spent on downloading the map data of the regions to be updated.

With the technical solution provided in this embodiment, by obtaining the regions to be updated and downloading the map data of the regions to be updated, the map data may be downloaded on demand, the traffic may be saved, and unnecessary data transmission may be reduced.

Embodiment 5

Based on above embodiments and corresponding to the method embodiment performed by the in-vehicle navigation device, a method for establishing a connection with the in-vehicle navigation device is provided in this embodiment, in which a WIFI hotspot is established by the in-vehicle navigation device.

Figure 5:
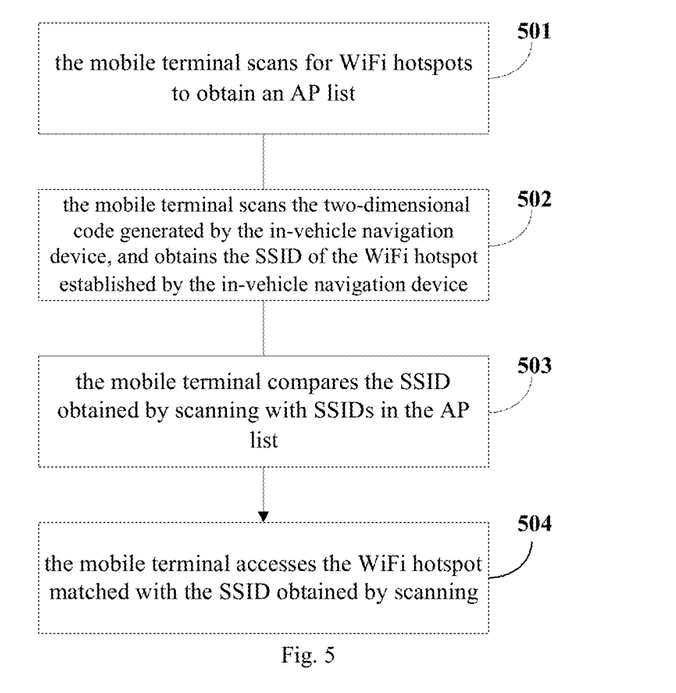
FIG. 5 is a flow chart showing establishing a connection with an in-vehicle navigation device in a method for assisting updating an in-vehicle navigation map according to an embodiment of the present disclosure.

Referring to the FIG. 5, the process of establishing the connection with the in-vehicle navigation device includes following steps.

In step 501, the mobile terminal scans for WiFi hotspots to obtain an AP.

For example, after the mobile terminal receives the command input by the user for scanning for WiFi hotspots, the WiFi hotspot scanning application may be started, and the AP list may be obtained. The AP list is a list including all WiFi hotspots scanned by the mobile terminal, in which the WiFi hotspots are arranged in sequence according to the signal strength and/or the connection times from high to low. The AP list contains the WiFi hotspot established by the in-vehicle navigation device.

In step 502, the mobile terminal scans a two-dimensional code generated by the in-vehicle navigation device, and obtains the SSID of the WiFi hotspot established by the in-vehicle navigation device.

In step 503, the mobile terminal compares the SSID obtained in step 502 with the SSIDs in the AP list, which is convenient compared to searching by the user.

In step 504, the mobile terminal accesses the WiFi hotspot matched with the SSID obtained by scanning, i.e. the WiFi hotspot established by the in-vehicle navigation device.

With the technical solution provided in this embodiment, the mobile terminal scans the two-dimensional code to obtain the SSID of the WiFi hotspot established by the in-vehicle navigation device, and accesses the AP matched with the SSID of the WIFI hotspot established by the in-vehicle navigation device after comparing the SSID of the WIFI hotspot established by the in-vehicle navigation device with SSIDs in the AP list, thus achieving connecting the mobile terminal with the in-vehicle navigation device automatically, such that the mobile terminal may obtain the configuration file of the map data from the in-vehicle navigation device more quickly, which is helpful for improving the efficiency of updating the data of the in-vehicle navigation map.

Embodiment 6

Figure 6:
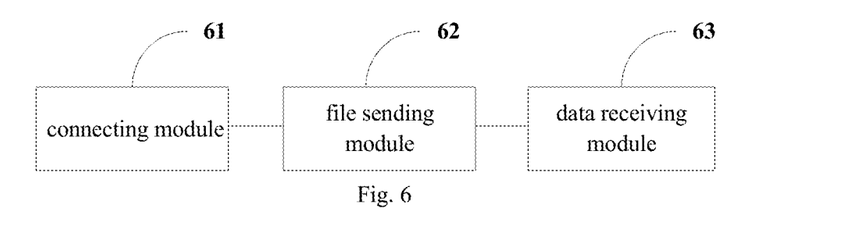
FIG. 6 is a block diagram of an in-vehicle navigation device according to an embodiment of the present disclosure.

Referring to the FIG. 6, the in-vehicle navigation device provided by this embodiment specifically includes a connecting module 61, a file sending module 62 and a data receiving module 63.

The connecting module 61 is configured to establish a connection with a mobile terminal.

The file sending module 62 is configured to send a configuration file of an in-vehicle navigation map to the mobile terminal via the connection, in which the configuration file contains regions and versions of map data corresponding to the regions.

The data receiving module 63 is configured to receive latest map data sent from the mobile terminal, and update in the in-vehicle navigation map the map data of regions corresponding to the latest map data, in which the latest map data is obtained by the mobile terminal according to the configuration file.

With the in-vehicle navigation device according to embodiments of the present disclosure, the file sending module sends the configuration file of the in-vehicle navigation map to the mobile terminal, the mobile terminal obtains the latest map according to the configuration file, and the data receive module receives the latest map sent by the mobile terminal. In this way, the map data of corresponding regions in the in-vehicle navigation map may be updated without going to 4S stores or repair factories, and thus the cost for updating the in-vehicle navigation map may be effectively reduced, and a user may update the in-vehicle navigation map via the mobile terminal in a self-service manner, which improves the efficiency and real-time property for updating the in-vehicle navigation map. Further, since the mobile terminal may download the map data via WIFI, zero traffic downloading may be achieved, which further saves the cost for updating the in-vehicle navigation map.

In an embodiment, the connecting module 61 may include a hotspot establishing sub-module and an access processing sub-module.

The hotspot establishing sub-module is configured to establish a WiFi hotspot.

The access processing sub-module is configured to receive and respond to a request initiated by the mobile terminal for accessing the WiFi hotspot.

Particularly, the hotspot establishing sub-module is configured to generate a two-dimensional code containing the SSID of the WIFI hotpsot, such that the mobile terminal may obtain the SSID of the WIFI hotspot by scanning the two-dimensional code.

In an embodiment, the file sending module sends the configuration file of the in-vehicle navigation map to the mobile terminal by SOCKET communication, and the data receiving module receives the latest map data sent by the mobile terminal by SOCKET communication.

The in-vehicle navigation device of the present disclosure may perform the method for updating the in-vehicle navigation map according to any embodiment of the present disclosure, and has function modules and benefits corresponding to respective steps in the method for updating the in-vehicle navigation map.

Embodiment 7

The mobile terminal provided in this embodiment is configured to achieve the method for assisting updating the in-vehicle navigation map in above embodiments.

Figure 7:
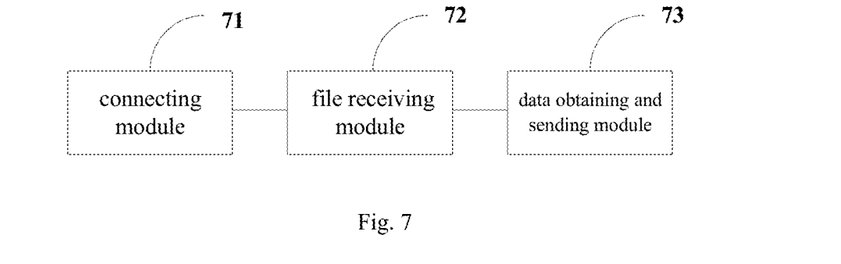
FIG. 7 is a block diagram of a mobile terminal according to an embodiment of the present disclosure.

Referring to the FIG. 7, the mobile terminal provided in this embodiment specifically includes a connecting module 71, a file receiving module 72, and a data obtaining and sending module 73.

The connecting module 71 is configured to establish a connection with an in-vehicle navigation device.

The file receiving module 72 is configured to receive a configuration file of an in-vehicle navigation map sent from the in-vehicle navigation device via the connection, in which the configuration file includes regions and versions of map data corresponding to the regions.

The data obtaining and sending module 73 is configured to obtain latest map data according to the configuration file, and send the latest map data to the in-vehicle navigation device, such that the in-vehicle navigation device may update the map data of regions corresponding to the latest map data.

With the mobile terminal provided in this embodiment, the file receiving module receives the configuration file of the in-vehicle navigation map sent by the in-vehicle navigation device, and the data obtaining and sending module obtains the latest map according to the configuration file and sends the latest map to the in-vehicle navigation device, such that the in-vehicle navigation device may update the map data of corresponding regions in the in-vehicle navigation map without going to 4S stores or repair factories, and thus the cost for updating the in-vehicle navigation map may be effectively reduced, and a user may update the in-vehicle navigation map via the mobile terminal in a self-service manner, which improves the efficiency and real-time property for updating the in-vehicle navigation map.

In an embodiment, the connecting module 71 includes a hotspot scanning sub-module and an access sub-module.

The hotspot scanning sub-module is configured to scan for WiFi hotspots to obtain an AP list, in which the AP list includes the WiFi hotspot established by the in-vehicle navigation device.

The access sub-module is configured to access the WiFi hotspot established by the in-vehicle navigation device.

In an embodiment, the mobile terminal may further include a code scanning module.

Before the access sub-module accesses the WIFI hotspot established by the in-vehicle navigation device, the code scanning module scans the two-dimensional code generated by the in-vehicle navigation device, and obtains the SSID of the WiFi hotspot established by the in-vehicle navigation device, in which the SSID of the WIFI hotspot established by the in-vehicle navigation device is included in the two-dimensional code.

In this case, the access sub-module is specifically configured to access the AP matched with the SSID of the WIFI hotspot established by the in-vehicle navigation device.

Specifically, the data obtaining and sending module 73 obtains the latest map data from the network side via WIFI.

In an embodiment, the data obtaining and sending module 73 includes a list obtaining sub-module and a data downloading sub-module.

The list obtaining sub-module is configured to obtain a region list from a map application server, in which the region list comprises regions whose map data is updatable and versions of map data corresponding to the regions.

The data downloading sub-module is configured to download the latest map data according to the configuration file and the region list.

In another embodiment, the data obtaining and sending module may further include a region determining sub-module.

The region determining sub-module is configured to compare the versions in the configuration file with the versions in the region list and to determine that a region is to be updated if the version of the region in the configuration file is lower than the version of the region in the region list, such that the data downloading sub-module downloads the latest map data of regions to be updated from the map application server.

For example, for a same region, if the version in the region list is the same with the version in the configuration file, the mobile terminal will not download the map data of this region. Instead, only when the version in the region list is higher than the version in the configuration file, the mobile terminal will download the map data of the region. Thus, in one hand, unnecessary data downloading and unnecessary network load may be reduced, and in the other hand, the download speed may be enhanced.

The above mobile terminal may perform the method for assisting updating the in-vehicle navigation map according to any embodiment of the present disclosure, and has functional modules and benefits corresponding to respective steps in the method for assisting updating the in-vehicle navigation map.

Embodiment 8

The present embodiment provides a system for updating an in-vehicle navigation map based on any of the in-vehicle navigation devices and any of the mobile terminals provided in the above embodiments.

Figure 8:
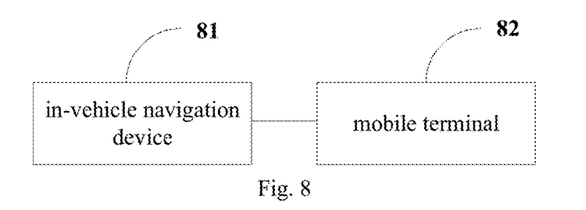
FIG. 8 is a block diagram of a system for updating an in-vehicle navigation map according to an embodiment of the present disclosure.

Referring to the FIG. 8, the system for updating the in-vehicle navigation map provided in the present embodiment specifically includes the in-vehicle navigation device 81 and the mobile terminal 82.

The in-vehicle navigation device 81 is configured to establish a connection with the mobile terminal 82, and send the configuration file of the in-vehicle navigation map to the mobile terminal 82 via the connection, in which the configuration file contains regions and versions of map data corresponding to the regions.

The mobile terminal 82 is configured to obtain the latest map data according to the configuration file, and send the latest map data to the in-vehicle navigation device 81.

The in-vehicle navigation device 81 is further configured to receive the latest map data, and update the map data of regions corresponding to the latest map data.

The in-vehicle navigation device 81 may be any of the in-vehicle navigation devices provided by the above embodiments, and the mobile terminal 82 may be any of the mobile terminals provided by the above embodiments.

The above system for updating the in-vehicle navigation map may perform the method for updating the in-vehicle navigation map and the method for assisting updating the in-vehicle navigation map in any of the above embodiments of the present disclosure, and has the corresponding in-vehicle navigation device, mobile terminal and benefits.

Embodiment 9

Base on Embodiment 8, an application solution of the system for updating the in-vehicle navigation map is provided in this embodiment.

Figure 9:
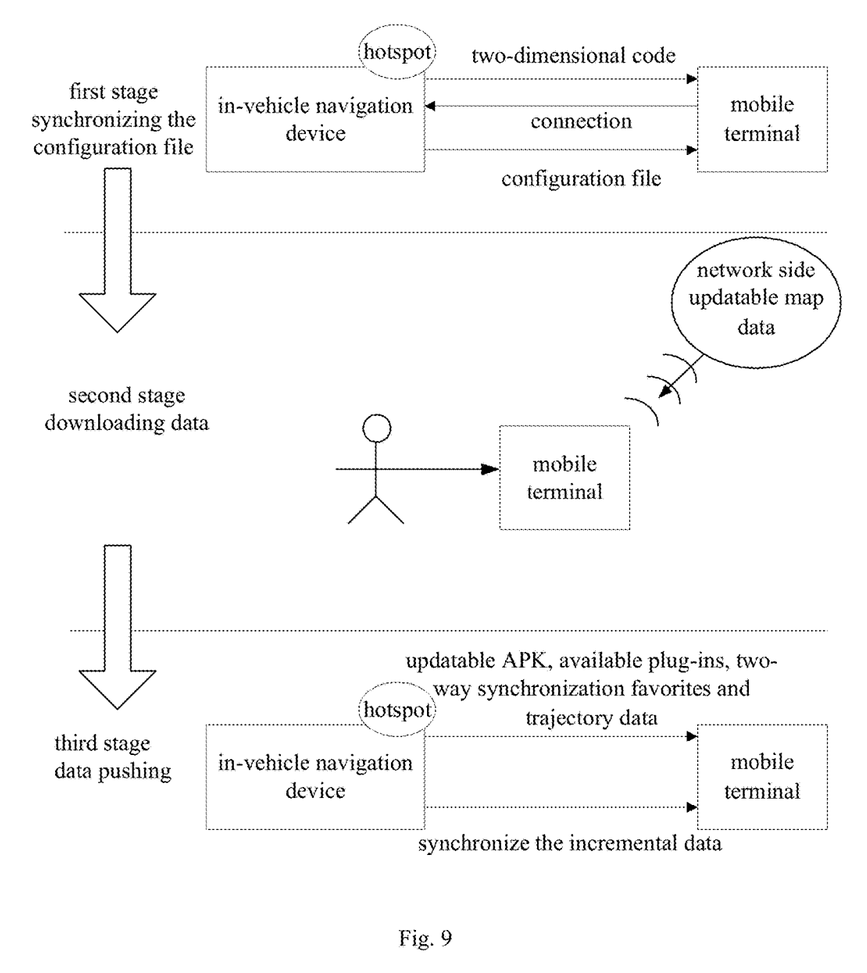
FIG. 9 is a schematic diagram showing a system for updating an in-vehicle navigation map according to an embodiment of the present disclosure.

Referring to FIG. 9, the system updates the in-vehicle navigation map in three stages.

In the first stage, the configuration file is synchronized. The in-vehicle navigation device sends the configuration file to the mobile terminal. Specifically, after the in-vehicle navigation device establishes a hotspot and generates the corresponding two-dimensional code, the mobile terminal scans the hotspot and the two-dimensional code and automatically accesses the hotspot to establish a connection with the in-vehicle navigation device, and the in-vehicle navigation device synchronizes the configuration file to the mobile terminal.

In the second stage, data is downloaded. The mobile terminal obtains the updatable data list and the updatable APK (Android Package) from the server, and then obtains the latest map data by instant downing or WIFI downloading. If the mobile terminal uses the instant downloading, the map data may be synchronized immediately to the mobile terminal. Otherwise, the mobile terminal downloads the latest map data in the WiFi environment.

In the third stage, data is pushed. The mobile terminal pushes the updatable APK, available plug-ins, two-way synchronization favorites and trajectory data to the in-vehicle navigation device, or the mobile terminal synchronizes the incremental data to the in-vehicle navigation device, such that the in-vehicle navigation device updates the navigation map using the data pushed by the mobile terminal.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or device (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium include but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs include one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for updating an in-vehicle navigation map, performed by an in-vehicle navigation device, and comprising:
    establishing a connection with a mobile terminal, including:
        establishing a Wireless Fidelity WiFi hotspot; and
        receiving and responding to a request initiated by the mobile terminal for accessing the WiFi hotspot;
    sending a configuration file of the in-vehicle navigation map to the mobile terminal via the connection, wherein the configuration file comprises regions and versions of map data corresponding to the regions; and
    receiving latest map data sent by the mobile terminal, and updating in the in-vehicle navigation map the map data of regions corresponding to the latest map data, wherein the latest map data is obtained by the mobile terminal according to the configuration file;
    wherein establishing a WiFi hotspot comprises:
        generating a two-dimensional code containing a Service Set Identifier SSID of the WiFi hotspot, such that the mobile terminal obtains the SSID of the WiFi hotspot by scanning the two-dimensional code;
    wherein the two-dimensional code is a machine-readable optical label.

2. The method according to claim 1, wherein the configuration file of the in-vehicle navigation map is sent to the mobile terminal by SOCKET communication, and the latest map data is sent from the mobile terminal to the in-vehicle navigation device by SOCKET communication.

3. A method for assisting in updating an in-vehicle navigation map, performed by a mobile terminal, and comprising:
    establishing a connection with an in-vehicle navigation device including:
        scanning for Wireless Fidelity WiFi hotspots to obtain an Access Point AP list, in which the AP list comprises the WiFi hotspot established by the in-vehicle navigation device;
        scanning a two-dimensional code generated by the in-vehicle navigation device to obtain a Service Set Identifier SSID of the WiFi hotspot generated by the in-vehicle navigation device, in which the SSID of the WiFi hotspot generated by the in-vehicle navigation device is included in the two-dimensional code; and
        accessing the WiFi hotspot established by the in-vehicle navigation device;
    receiving a configuration file of the in-vehicle navigation map from the in-vehicle navigation device via the connection, wherein the configuration file comprises regions and versions of map data corresponding to the regions; and
    obtaining latest map data according to the configuration file, and sending the latest map data to the in-vehicle navigation device for updating the map data of regions corresponding to the latest map data;
    wherein the two-dimensional code is a machine-readable optical label.

4. The method according to claim 3, wherein accessing the WiFi hotspot established by the in-vehicle navigation device comprises:
    accessing the AP matched with the SSID in the AP list.

5. The method according to claim 3, wherein the latest map data is obtained from a network side via WiFi.

6. The method according to claim 3, wherein obtaining latest map data according to the configuration file comprises:
    obtaining a region list from a map application server, in which the region list comprises regions whose map data is updatable and versions of map data corresponding to the regions in the map application server; and
    downloading the latest map data from the map application server according to the region list and the configuration file.

7. The method according to claim 6, wherein downloading the latest map data according to region list and the configuration file comprises:
    comparing the versions in the configuration file with the versions in the region list to obtain regions to be updated, in which the version of a region to be updated in the configuration file is lower than the version of the region to be updated in the region list; and
    downloading the latest map data of the regions to be updated from the map application server.

8. An in-vehicle navigation device, comprising:
    a processor; and
    a memory, configured to store instructions executable by the processor,
    wherein, the processor is configured to:
        establish a connection with a mobile terminal by:
            establishing a Wireless Fidelity WiFi hotspot; and
            receiving and responding to a request initiated by the mobile terminal for accessing the WiFi hotspot;
        send a configuration file of a in-vehicle navigation map to the mobile terminal via the connection, wherein the configuration file comprises regions and versions of map data corresponding to the regions; and
        receive latest map data sent by the mobile terminal, and update in the in-vehicle navigation map the map data of regions corresponding to the latest map data, in which the latest map data is obtained by the mobile terminal according to the configuration file;
    wherein establishing a WiFi hotspot comprises:
        generating a two-dimensional code containing a Service Set Identifier SSID of the WiFi hotspot, such that the mobile terminal obtains the SSID of the WiFi hotspot by scanning the two-dimensional code;
    wherein the two-dimensional code is a machine-readable optical label.

9. The in-vehicle navigation device according to claim 8, wherein the processor is configured to send the configuration file of the in-vehicle navigation map to the mobile terminal by SOCKET communication, and receive the latest map data sent from the mobile terminal by SOCKET communication.

* * * * *